(12) United States Patent
Tamiya et al.

(10) Patent No.: US 10,240,034 B2
(45) Date of Patent: *Mar. 26, 2019

(54) SILICONE ACRYLAMIDE COPOLYMER

(71) Applicant: Johnson & Johnson Vision Care, Inc., Jacksonville, FL (US)

(72) Inventors: Ryuta Tamiya, Shiga (JP); Kazuhiko Fujisawa, Shiga (JP); Masataka Nakamura, Shiga (JP); Thomas L. Maggio, Jacksonville, FL (US); Michelle Carman Turnage, Jacksonville, FL (US); Michael R. Clark, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,486

(22) Filed: Jul. 24, 2017

(65) Prior Publication Data
US 2017/0321051 A1    Nov. 9, 2017

Related U.S. Application Data

(63) Continuation of application No. 14/670,981, filed on Mar. 27, 2015, now Pat. No. 9,745,460.

(60) Provisional application No. 61/972,847, filed on Mar. 31, 2014.

(51) Int. Cl.
| C08F 30/08 | (2006.01) |
| C08F 290/06 | (2006.01) |
| G02B 1/04 | (2006.01) |
| C08L 39/06 | (2006.01) |
| C08L 43/04 | (2006.01) |
| C08F 230/08 | (2006.01) |
| C08F 222/38 | (2006.01) |

(52) U.S. Cl.
CPC ............ *C08L 39/06* (2013.01); *C08F 222/38* (2013.01); *C08F 222/385* (2013.01); *C08F 230/08* (2013.01); *C08F 290/068* (2013.01); *C08L 43/04* (2013.01)

(58) Field of Classification Search
CPC .................................. C08L 43/04; G02B 1/04
See application file for complete search history.

(56) References Cited

U.S. PATENT DOCUMENTS

| 4,711,943 A | 12/1987 | Harvey, III |
| 4,834,753 A | 5/1989 | Sulc et al. |
| 4,890,911 A | 1/1990 | Sulc et al. |
| 5,336,797 A | 8/1994 | McGee et al. |
| 5,346,976 A | 9/1994 | Ellis et al. |
| 5,399,737 A | 3/1995 | Park et al. |
| 5,505,884 A | 4/1996 | Burke et al. |
| 5,512,205 A | 4/1996 | Lai |
| 5,994,488 A | 11/1999 | Yokota et al. |
| 5,998,498 A | 12/1999 | Vanderlaan et al. |
| 6,020,445 A | 2/2000 | Vanderlaan et al. |
| 6,367,929 B1 | 4/2002 | Maiden et al. |
| 7,091,283 B2 | 8/2006 | Muller et al. |
| 7,214,809 B2 | 5/2007 | Zanini et al. |
| 7,396,890 B2 | 7/2008 | Zanini et al. |
| 8,618,187 B2 * | 12/2013 | Seiferling ............... G02B 1/043 252/183.11 |
| 9,745,460 B2 * | 8/2017 | Tamiya ................... C08L 43/04 |
| 2004/0192872 A1 | 9/2004 | Iwata et al. |
| 2005/0176911 A1 | 8/2005 | Zanini et al. |
| 2006/0072069 A1 | 4/2006 | Laredo et al. |
| 2006/0165934 A1 | 7/2006 | Okazaki et al. |
| 2006/0276608 A1 | 12/2006 | Lang et al. |
| 2007/0167592 A1 | 7/2007 | Zanini et al. |
| 2008/0045612 A1 | 2/2008 | Rathore et al. |
| 2008/0121798 A1 | 5/2008 | Hieke |
| 2008/0234457 A1 | 9/2008 | Zhou et al. |
| 2008/0305292 A1 | 12/2008 | Okazaki et al. |
| 2009/0252868 A1 | 10/2009 | Phelan |
| 2010/0258961 A1 | 10/2010 | Chang et al. |
| 2011/0009519 A1 | 1/2011 | Awasthi et al. |
| 2011/0063567 A1 | 3/2011 | Domschke et al. |
| 2011/0133350 A1 | 6/2011 | Qiu et al. |

(Continued)

FOREIGN PATENT DOCUMENTS

| EP | 1956033 B1 | 5/2009 |
| JP | 10212355 | 8/1998 |

(Continued)

OTHER PUBLICATIONS

Crivello, et al, Photoinitiators for Free Radical Cationic & Anionic Photopolymerisation, 2nd Edition, vol. III, pp. 275-298, John Wiley and Sons, New York, 1998.
Laschewsky et al., Macromol. Chem. Phys. 2001, vol. 202, pp. 276-286.
PCT International Search Report dated Oct. 13, 2011, for PCT Int'l. appln. No. PCT/US2011/028847.
PCT International Search Report, dated Jul. 22, 2015, for PCT Int'l Appln. No. PCT/US2015/023249.
PCT International Search Report, dated Jul. 22, 2015, for PCT Int'l Appln. No. PCT/US2015/023251.

(Continued)

*Primary Examiner* — Tae H Yoon
(74) *Attorney, Agent, or Firm* — Raef M. Shaltout

(57) ABSTRACT

The present invention relates to a silicone acrylamide copolymer of high acrylamide monomer content which has transparency and low modulus, employing the following configuration. The copolymer is suitably used for various kinds of medical devices, particularly ophthalmic lenses such as a contact lens, an intraocular lens, an artificial cornea, and is especially suitable for a contact lens. A copolymer comprising (A) a multi-functional (meth)acrylamide monomer having at least one siloxane bond and at least two (meth)acrylamide groups within a molecule and (B) a mono-functional linear silicone (meth)acrylamide monomer.

30 Claims, No Drawings

(56) References Cited

U.S. PATENT DOCUMENTS

| | | |
|---|---|---|
| 2011/0211158 A1 | 9/2011 | Iwata et al. |
| 2011/0237766 A1 | 9/2011 | Maggio et al. |
| 2012/0046382 A1 | 2/2012 | Zhou et al. |
| 2012/0245248 A1 | 9/2012 | Alli |

FOREIGN PATENT DOCUMENTS

| | | |
|---|---|---|
| JP | 2004517163 | 6/2004 |
| JP | 2007526364 | 9/2007 |
| WO | 2003022321 A2 | 3/2003 |
| WO | 2003022322 A2 | 3/2003 |
| WO | 2005078482 A1 | 8/2005 |
| WO | 2008005229 A2 | 1/2008 |
| WO | 2009001987 A1 | 12/2008 |
| WO | 2010071691 A1 | 6/2010 |
| WO | 2010147874 A1 | 12/2010 |
| WO | 2011005937 A2 | 1/2011 |
| WO | 2011116206 A1 | 9/2011 |
| WO | 2011116210 A2 | 9/2011 |
| WO | 2013024801 A1 | 2/2013 |

OTHER PUBLICATIONS

PCT International Search Report, dated Jun. 27, 2011, for PCT Int'l. Appln. No. PCT/2011/028842.

* cited by examiner

SILICONE ACRYLAMIDE COPOLYMER

RELATED APPLICATIONS

This application is a continuation of U.S. patent application Ser. No. 14/670,981, filed Mar. 27, 2015, now U.S. Pat. No. 9,745,460, which claims priority to U.S. Provisional Patent Application No. 61/972,847, filed on Mar. 31, 2014 entitled SILICONE ACRYLAMIDE COPOLYMER, the contents of which are incorporated by reference.

TECHNICAL FIELD

The present invention relates to a silicone acrylamide copolymer, and the silicone acrylamide copolymer is especially suitably used for medical devices such as ophthalmic lenses, endoscopes, catheters, transfusion tubes, gas transport tubes, stents, sheaths, cuffs, tube connectors, access ports, drainage bags, blood circuits, wound covering materials and various kinds of medicine carriers, particularly contact lenses, intraocular lenses, artificial corneas and the like.

BACKGROUND

In recent years, a silicone hydrogel has been known as a material of a contact lens for use in continuous wear. The silicone hydrogel is obtained by combining a silicone component with a hydrophilic component, and as one example thereof is known a silicone hydrogel obtained by polymerizing a polymerization mixture containing a silicone acrylamide monomer, and a hydrophilic acrylamide monomer, a hydrophilic methacrylate and an internal wetting agent for imparting wettability to a surface (U.S. Pat. No. 7,396,890 and U.S. Pat. No. 7,214,809).

However, the compositions described in U.S. Pat. No. 7,396,890 and U.S. Pat. No. 7,214,809 have at least one methacrylate as a component in a relatively large amount. The resulting mixed acrylate/methacrylamide systems display a reduction in the polymerization rate of the system compared to an all acrylamide system.

Japanese Patent Laid-Open No. H10-212355 and U.S. Pat. No. 4,711,943 disclose silicone hydrogels comprised of a silicone acrylamide monomer and a hydrophilic acrylamide monomer. Such silicone hydrogels have compositions mostly constituted by acrylamide monomers, and improvement of the polymerization rate of the whole system is expected. However, crosslinkers used in these documents have methacrylate group such as ethylene glycol dimethacrylate or tetraethylene glycol dimethacrylate. When such crosslinkers are copolymerized with a (meth)acrylamide monomer, the crosslinker is consumed early in the polymerization. This can lead to a heterogenous polymer network and optical distortion may occur when a contact lens is produced using such a polymer.

U.S. Pat. No. 4,711,943 also discloses a composition using a silicone bisacrylamide monomer as a main component of the polymer. Lenses formed from these monomers are hard, and wearer comfort is decreased.

Silicone containing bis(meth)acrylamide monomers having two (meth)acrylamide groups have also been disclosed. WO 2010/147874 discloses Ma2D37 having a silicone segment with 37 repeating units in a silicone bis(meth) acrylamide monomer. However, the only silicone component disclosed to be polymerized with the silicon bis(meth) acrylamide is a mono-functional branched silicone (meth) acrylamide monomer. The resulting polymer displayed poor shape recovery. The composition disclosed in WO 2010/147874 also contains N-vinylpyrrolidone in a relatively large amount, which negatively effects the polymerization rate as well.

WO2010/071691 discloses silicone bis(meth)acrylamide monomers having molecular weights of 4500 and 11000. WO2010/071691 also discloses that it is critical to include a silicone-containing vinylic monomer having a tris(trialkylsilyloxy)silylalkyl group to eliminate optical defects. The polymers are disclosed to exhibit a "healing" effect (folding marks become transient), however, "shape recovery", or the ability of a polymer to recover tensile strength after being released from polymer elongation, is not disclosed. Shape recovery is evaluated by measuring stress zero time. Stress zero time of the polymers in the reference is expected to be longer (worse shape recovery) than those in the present invention because mono-functional silicone acrylamide is not linear silicone.

US2011/0009519 discloses Ma2D37 as a silicone bis (meth)acrylamide monomer. Various monomers are polymerized with Ma2D37, but none are mono-functional (meth) acrylamide silicone monomers as presently disclosed. The closest monomer has —Si—CH2-CH2-Si— bond alternating with the —Si—O—Si— bonds and an undesirably high modulus.

European Patent No. 1956033 discloses a silicone bisacrylamide monomer in Synthesis Example 10. However, this monomer is only used as an intermediate for synthesizing a silicone tetraacrylamide compound in Example 10, and there are no descriptions of copolymerization with other silicone monomers, the modulus, transparency or any other properties of a copolymer obtained thereby.

N,N'-methylenebisacrylamide (hereinafter referred to as MBA) is a commercially available acrylamide crosslinker. Unfortunately when MBA is used as a crosslinker, undesirably high moduli are obtained. When the amount of crosslinker is decreased, the modulus is reduced, but the copolymer loses transparency before the modulus is sufficiently reduced, thus making it difficult to have both the low modulus and transparency. Furthermore, when an attempt was made to reduce the modulus by using various bisacrylamides having extended methylene chains, there was no significant difference in modulus compared to MBA, and when the amount of crosslinker was decreased, the transparency was reduced, thus making it difficult to have both low modulus and transparency.

SUMMARY

The present invention provides a copolymer which has a high acrylamide monomer content, is transparent and has a low modulus.

In one embodiment, the present invention relates to a copolymer comprising (A) a multi-functional (meth)acrylamide monomer having at least one siloxane bond and at least two (meth)acrylamide groups within a molecule and (B) a mono-functional linear silicone (meth)acrylamide monomer.

In one embodiment the multi-functional (meth)acrylamide monomer has two (meth)acrylamide groups.

When the multi-functional (meth)acrylamide monomer comprises two (meth)acrylamide groups, it may in one embodiment be represented by formula (a1).

Formula:

[Chemical Formula 1]

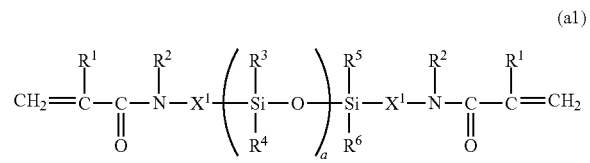

(a1)

wherein
each $R^1$ is independently selected from hydrogen and methyl;
$R^2$ is independently selected from hydrogen, or an alkyl which may be substituted and has 1 to 20 carbon atoms, or an aryl which may be substituted and has 6 to 20 carbon atoms;
$R^3$ to $R^6$ are each an alkyl which may be substituted and has 1 to 20 carbon atoms, or an aryl which may be substituted and has 6 to 20 carbon atoms;
$X^1$ is independently selected from substituted or unsubstituted divalent organic groups having 1 to 20 carbon atoms; and
a represents an integer of 1 to 15.

DETAILED DESCRIPTION

The present invention provides a copolymer which has a high acrylamide monomer content, is transparent and has a low modulus. The copolymer is suitably used for various kinds of medical devices, particularly ophthalmic lenses such as a contact lens, an intraocular lens, an artificial cornea, and is especially suitable for a contact lens.

Copolymers of the present invention may be obtained by polymerizing a polymerization mixture comprising components (A) and (B) described below.

(A) is at least one multi-functional (meth)acrylamide monomer having at least one siloxane bond and at least two (meth)acrylamide groups within a molecule and (B) is at least one a mono-functional linear silicone (meth)acrylamide monomer.

In the present invention, siloxane bond refers to a Si—O—Si bond.

The term "lens" refers to ophthalmic devices that reside in or on the eye. These devices can provide optical correction, cosmetic enhancement, UV blocking and visible light or glare reduction, therapeutic effect, including wound healing, delivery of drugs or neutraceuticals, diagnostic evaluation or monitoring, or any combination thereof. The term lens includes, but is not limited to, soft contact lenses, hard contact lenses, intraocular lenses, overlay lenses, ocular inserts, and optical inserts.

"Multi-functional monomer" refers to a monomer having two or more radically polymerizable organic groups.

"Mono-functional monomer" refers to a monomer having one radically polymerizable organic group. The radically polymerizable organic group is preferably the (meth)acrylamide group.

The phrase "(meth)acrylamide group" refers to an acrylamide group or a methacrylamide group. In some embodiments the radically polymerizable organic group is preferably an acrylamide group because of the faster polymerization rate of acrylamide monomers.

As used herein "substituted" means hydroxyl, acid, ester, ether, thiol, and combinations thereof.

As used herein "parts by mass" in the present invention represents a mass ratio based on 98.8 parts by mass of the components of the polymerizable mixture excluding the multi-functional (meth)acrylamide monomer and polymerization solvent. For example, in the formulation of Example 1, the parts by mass is calculated based upon the polymerizable mixture components except the SiBA and t-amyl alcohol.

"Linear silicone" refers to a structure represented by the following general formula (P1) [Chemical Formula 3].

(P1)

$R^q$ is a group containing no silicon atom, and comprises a (meth)acrylamide group when the linear silicone is a linear silicone (meth)acrylamide monomer. $R^a$ to $R^e$ represents a group containing no silicon atom, and may be independently selected from are substituted or unsubstituted alkyl groups having 1 to 20 carbon atoms, or substituted or unsubstituted aryl groups having 6 to 20 carbon atoms, and n represents an integer of 1 or greater, 1-1000 or 1-100. In the present invention, if a monomer has repeating units, such as poly (dimethylsiloxane), the number of the repeating units may have a distribution unless otherwise specified.

The multi-functional (meth)acrylamide monomer used for the copolymer of the present invention can be a crosslinking component, and such a compound contains a siloxane bond, and therefore imparts good mechanical characteristics and oxygen permeability to the copolymer.

The term (meth)acryl refers to both methacryl and acryl, and the terms of (meth)acryloyl, (meth)acrylate, (meth) acrylamide" and the like are construed alike.

A "reactive mixture" is the mixture components, including, reactive components, diluent (if used), initiators, crosslinkers and additives, which when subjected to polymer forming conditions form a polymer. "Reactive components" are the components in the reaction mixture, which upon polymerization, become a permanent part of the polymer, either via chemical bonding or entrapment or entanglement within the polymer matrix. For example, reactive monomers, prepolymers and macromers become part of the polymer via polymerization, while non-reactive polymeric internal wetting agents, such as PVP, become part of the polymer via entrapment to form an interpenetrating network. The diluent (if used) and any additional processing aids, such as deblocking agents do not become part of the structure of the polymer and are not reactive components.

"Radically polymerizable components" include components which contain at least one carbon-carbon double bond group which can polymerize when subjected to radical polymerization initiation conditions. Examples of polymerizable groups include acrylate, methacrylate, styryl, vinyl, allyl, N-vinyl lactam, and the like.

A "non-silicone" monomer is a monomer with no siloxanyl groups.

Hydrophilic monomers are those which yield a clear single phase when mixed with water at 25° C. at a concentration of 10 wt %.

The multi-functional (meth)acrylamide monomer used for the copolymer of the present invention has two or more (meth)acrylamide groups. The number of (meth)acrylamide groups in each multifunctional (meth)acrylamide monomer may be selected from the following ranges, 2 to 10, 2 to 6, 2 to 4, and 2. If the number of (meth)acrylamide groups in the monomer is too large, the modulus of the copolymer may be undesirably increased.

If the mass average molecular weight of the multifunctional (meth)acrylamide monomer used for the copolymer of the present invention is too high, hydrophobicity may become so high that a transparent copolymer is hard to obtain. Suitable mass average molecular weight ranges for the multifunctional (meth)acrylamide monomer include less than about 1500, and about 350 to about 1500. When the multifunctional (meth)acrylamide monomer is copolymerized with a monomer having a hydrophilicity higher than that of the multifunctional (meth)acrylamide monomer, the mass average molecular weight of the multifunctional (meth)acrylamide monomer may be between about 350 to about 500 and between about 500 to about 1500 when it is desired to improve the oxygen permeability and shape recovery.

Examples of the multi-functional (meth)acrylamide monomer used for the copolymer of the present invention include monomers represented by the following general formula (a1)

[Chemical Formula 4].

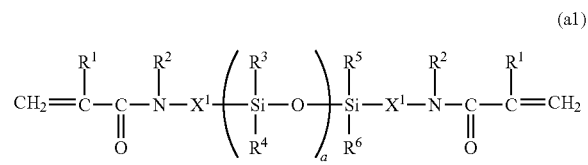

In formula (a1), each $R^1$ is independently selected from hydrogen and methyl. In some embodiments hydrogen is preferred for increasing the polymerization rate of the multi-functional (meth)acrylamide monomer.

Each $R^2$ independently represents hydrogen, or a substituted or unsubstituted alkyl having 1 to 20 carbon atoms, or a substituted or unsubstituted aryl having 6 to 20 carbon atoms. The alkyl may be branched or linear. The substituted groups of the alkyl are halogen (F, Cl, Br, I), hydroxyl, amino, ether, carboxyl, ester, amide, sulfonyl, phenyl, and naphthyl. The substituted groups of the aryl are halogen (F, Cl, Br, I), hydroxyl, amino, ether, carboxyl, ester, amide, sulfonyl, C1-C6 alkyl, phenyl, and naphthyl. Examples of $R^2$ groups include hydrogen, methyl, ethyl, propyl, n-propyl, i-propyl, n-butyl, s-butyl, t-butyl, n-pentyl, i-pentyl, s-pentyl, neopentyl, hexyl, heptyl, octyl, nonyl, decyl, dodecyl, icosyl, phenyl and naphthyl. If the number of carbon atoms of $R^2$ is too large, the silicone content may decrease, which reduces the oxygen permeability. Thus, in embodiments where oxygen permeabilities in excess of about 70 and in some cases about 80 barrers are desired, $R^2$ may be selected from hydrogen or an unsubstituted alkyl or unsubstituted aryl having 1 to 10 carbon atoms, or hydrogen or an unsubstituted alkyl having 1 to 4 carbon atoms, or hydrogen, ethyl or methyl.

$R^3$ to $R^6$ each independently represent an alkyl which may be substituted and has 1 to 20 carbon atoms, or an aryl which may be substituted and has 6 to 20 carbon atoms. The substituted groups of the alkyl are halogen (F, Cl, Br, I), hydroxyl, amino, ether, carboxyl, ester, amide, sulfonyl, phenyl, and naphthyl. The substituted groups of the aryl are halogen (F, Cl, Br, I), hydroxyl, amino, ether, carboxyl, ester, amide, sulfonyl, C1-C6 alkyl, phenyl, and naphthyl. If the number of carbon atoms of $R^3$ to $R^6$ is too large, the content of silicon atoms may relatively decrease, leading to a reduction in oxygen permeability. Thus, in embodiments where oxygen permeabilities in excess of about 70 and in some cases about 80 barrers are desired, $R^3$ to $R^6$ are selected from (a) unsubstituted alkyl groups having 1 to 10 carbon atoms or an unsubstituted aryl groups having 6 to 10 carbon atoms, (b) unsubstituted alkyl groups having 1 to 4 carbon atoms, or (c) methyl groups.

Each $X^1$ independently represents a divalent organic group which may be substituted and has 1 to 20 carbon atoms. The substituted groups of the divalent organic group are halogen (F, Cl, Br, I), hydroxyl, amino, ether, carboxyl, ester, amide, sulfonyl, C1-C6 alkyl, phenyl, and naphthyl. Among the divalent organic group, alkylene and arylene groups are preferable. The alkylene and arylene group may be branched or linear. Examples thereof include methylene, ethylene, propylene, butylene, pentylene, octylene, decylene and phenylene. Among them, an alkylene having 1 to 10 carbon atoms is preferable, an alkylene having 1 to 5 carbon atoms is further preferable. When $X^1$ is propylene, copolymers having a low modulus can be easily obtained.

a represents an integer of 1 to 15. If the value of a is too large, the hydrophobicity of the multi-functional (meth)acrylamide monomer may increase making forming transparent copolymers, and particularly those containing polymeric wetting agents in the reactive mixture more difficult. Therefore in some embodiments a is preferably between 1 to 5. In embodiments where copolymers having oxygen permeabilities greater than about 80, and in some embodiments 100 barrers are desired a may have value of 7 to 13. Desirable molecular weights for the multi-functional (meth)acrylamide monomer include those up to 10,000, and between about 300 and about 5000 weight average molecular weight.

The lower concentration of multi-functional (meth)acrylamide monomer which may be included in the reactive mixtures of the present application is about 0.1 part, more preferably about 1.0 part by mass, further preferably 1.5 parts by mass or greater as the shape and appearance may be impaired due to insufficient polymerization if concentration of multi-functional (meth)acrylamide monomer is too small. If the concentration of the multi-functional (meth)acrylamide monomer is too high the modulus of the resulting copolymer may be undesirably high. Accordingly, the upper concentration limits for the multi-functional (meth)acrylamide monomer are about 20 parts by mass, preferably 10 parts by mass, more preferably 5 parts by mass or less. The foregoing upper and lower ranges may be combined in any combination.

The oxygen permeability of the resulting copolymers may also be increased by including in the reactive mixture at least one mono-functional linear silicone (meth)acrylamide monomer. The inclusion of at least one mono-functional linear silicone (meth)acrylamide monomer increases the oxygen permeability of the resulting copolymer without increasing the modulus, as would be the case if additional multi-functional monomer was added instead. Furthermore, the use of a linear silicone (meth)acrylamide monomer can improve the shape recovery of the resulting polymer.

The mono-functional linear silicone (meth)acrylamide monomer comprises one (meth)acrylamide functional group and a at least one linear silicone group.

Suitable examples of the mono-functional linear silicone (meth)acrylamide monomer include monomers of formula (z)

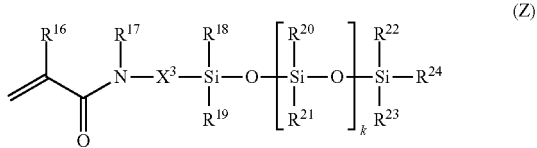

(Z)

Where $R^{16}$ is selected from hydrogen and methyl. When $R^{16}$ is hydrogen the copolymer systems display a faster polymerization rate.

$R^{17}$ represents hydrogen, or $C_1$ to $C_{20}$ alkyl group which may be substituted with a hydroxyl group, or a $C_6$ to $C_{20}$ aryl group which may be substituted with a hydroxyl, or a group represented by the following general formula (z0).

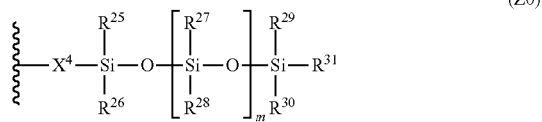

(Z0)

In formula (z) and (z0), $R^{18}$ to $R^{23}$, and $R^{25}$ to $R^{30}$ each independently represent a $C_1$ to $C_{20}$ alkyl which may be substituted, or a $C_6$ to $C_{20}$ aryl which may be substituted. If the number of carbon atoms of $R^{18}$ to $R^{23}$ and $R^{25}$ to $R^{30}$ is too large, the content of silicon atoms may relatively decrease, leading to a reduction in oxygen permeability of the copolymer. Thus in embodiments where oxygen permeabilities greater than about 80 or 100 barrers are desired, $R^{18}$ to $R^{23}$ and $R^{25}$ to $R^{30}$ are independently selected from alkyl groups having 1 to 10 carbon atoms or aryl groups having 6 to 10 carbon atoms, preferably alkyl groups having 1 to 4 carbon atoms, and in some embodiments $R^{18}$ to $R^{23}$ and $R^{25}$ to $R^{30}$ are methyl groups.

$X^3$ and $X^4$ are independently selected from C1-C20 alkylene groups which may be substituted with hydroxyl group. If the number of carbon atoms of $X^3$ and $X^4$ is too large, the ability of the mono-functional linear silicone (meth)acrylamide monomer to compatibilize with hydrophilic components may be reduced. Thus, where it is desirable for the mono-functional linear silicone (meth)acrylamide monomer to provide compatibilization to the reactive mixture, $X^3$ and $X^4$ are preferably $C_1$-$C_{10}$ alkylene groups or $C_1$-$C_4$ alkylene groups, which may be substituted with a hydroxyl group.

k and m are independently select from integers of 1 to 1000. Polymer systems with a desirable balance of oxygen permeability and compatibility with hydrophilic monomers and polymers can be readily obtained when k and m are 1 to 50, 2 to 30, 3 to 12.

$R^{24}$ and $R^{31}$ represent a $C_1$ to $C_{20}$ alkyl which may be substituted, or a $C_6$ to $C_{20}$ aryl which may be substituted. As the number of carbons in the alkyl groups increases, the content of silicon atoms may relatively decrease, leading to a reduction in oxygen permeability of the copolymer. Thus, in embodiments where oxygen permeabilities greater than about 80 or 100 barrers are desired an alkyl having 1 to 10 carbon atoms or an aryl having 6 to 10 carbon atoms is more preferable, an alkyl having 1 to 6 carbon atoms is further preferable. When $R^{24}$ and $R^{31}$ are methyl, the polymers may display reduced stability, particularly when a carboxylic acid is included as a monomeric or polymeric component in the reaction mixture. In this embodiment $R^{24}$ and $R^{31}$ may be selected from alkyl groups having 2 to 4 carbon atoms.

For copolymers having oxygen permeabilities greater than about 80 and in some embodiments greater than about 100, it may be desirable to use a mono-functional linear silicone (meth)acrylamide monomer having no hydroxy groups. Examples of suitable mono-functional linear silicone (meth)acrylamide monomers include monomers represented by the following formulae (Z1) to (Z6)

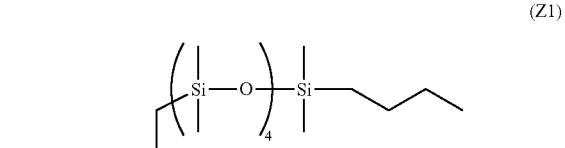

(Z1)

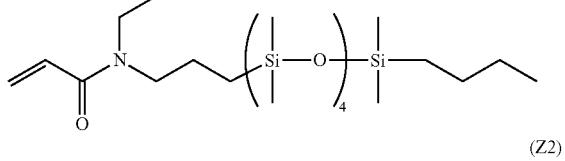

(Z2)

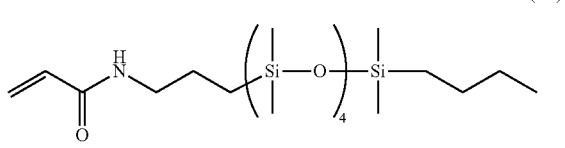

(Z3)

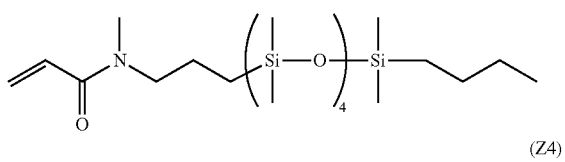

(Z4)

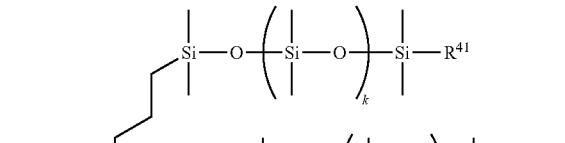

(Z5)

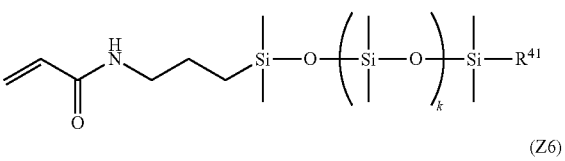

(Z6)

In formulae (Z4) to (Z6), k represents an integer of 3-12. $R^{41}$ represents a $C_1$ to $C_4$ alkyl group.

Among monomers of the above formulae (Z1) to (Z6), more preferable are those of formulae (Z2) and (Z3) in a sense that compatibility can be easily obtained when the monomer is copolymerized with a hydrophilic component.

Where improved compatibility of the reactive mixture or transparency of the resulting copolymer is desired, mono-functional linear silicone (meth)acrylamide monomer comprising at least one hydroxyl group may be desirable. This may be particularly advantageous when the copolymer is used for an ophthalmic lens.

Suitable examples of the mono-functional linear silicone (meth)acrylamide monomer having at least one hydroxy group include monomers represented by the following general formula (a2)

[Chemical Formula 6]

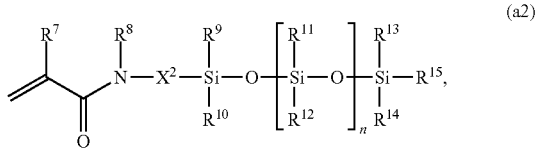

In formula (a2), $R^7$ is one selected from hydrogen and methyl. When $R^7$ is hydrogen the copolymer systems display a faster polymerization rate.

$R^8$ represents hydrogen, or $C_1$ to $C_{20}$ alkyl group which may be substituted with a hydroxy group, or a $C_6$ to $C_{20}$ aryl group which may be substituted with a hydroxy. In some embodiments $R^8$ is hydrogen, or a $C_1$-$C_{10}$ alkyl or $C_6$-$C_{10}$ aryl which may be substituted with a hydroxy group, and in another embodiment $R^8$ is hydrogen or a $C_1$-$C_4$ alkyl which may be substituted with a hydroxy group. Specific examples of $R^8$ include hydrogen, 2-hydroxyethyl, 2-hydroxypropyl, 3-hydroxypropyl, 2,3-dihydroxypropyl, 4-hydroxybutyl and 2-hydroxy-1,1-bis(hydroxymethyl)ethyl. A preferred example of $R^8$, when $X^2$ has a hydroxy group, is hydrogen. A preferred example of $R^8$, when $X^2$ has no hydroxy group, is 2,3-dihydroxypropyl.

$R^9$ to $R^{14}$ each independently represent a $C_1$ to $C_{20}$ alkyl which may be substituted, or a $C_6$ to $C_{20}$ aryl which may be substituted. The substituted groups of the alkyl are halogen (F, Cl, Br, I), hydroxyl, amino, ether, carboxyl, ester, amide, sulfonyl, phenyl, and naphthyl. The substituted groups of the aryl are halogen (F, Cl, Br, I), hydroxyl, amino, ether, carboxyl, ester, amide, sulfonyl, C1-C6 alkyl, phenyl, and naphthyl. If the number of carbon atoms of $R^9$ to $R^{14}$ is too large, the volume fraction of silicon atoms may relatively decrease, leading to a reduction in oxygen permeability of the copolymer. Thus in embodiments where oxygen permeabilities greater than about 80 or 100 barrers are desired, $R^9$ to $R^{14}$ are independently selected from $C_1$-$C_{10}$ alkyl groups or $C_6$-$C_{10}$ aryl groups, preferably $C_1$-$C_4$ alkyl groups, and in some embodiments $R^9$ to $R^{14}$ are methyl groups.

$X^2$ represents a $C_1$-$C_{20}$ alkylene group which may be substituted with a hydroxy group. The alkylene group may be branched or linear. If the number of carbon atoms of $X^2$ is too large, the ability of the mono-functional linear silicone (meth)acrylamide monomer to compatibilize with hydrophilic components may be reduced. Thus, where it is desirable for the mono-functional linear silicone (meth)acrylamide monomer to provide compatibilization to the reactive mixture, $X^2$ may be a $C_1$-$C_{10}$ alkylene which may be substituted with hydroxyl group. Examples of $X^2$, when $R^8$ comprises at least one hydroxy group, include methylene, ethylene, propylene, butylene, pentalene, octalene, decylene and phenylene. $X^2$ may be propylene where a modulus less than about 100 psi is desired.

When $R^8$ of the hydroxyl-substituted, mono-functional linear silicone (meth)acrylamide monomer does not contain at least one hydroxyl group, $X^2$ may contain at least one hydroxyl group. Examples of hydroxyl substituted $X^2$ groups include those of formula (b) and (c):

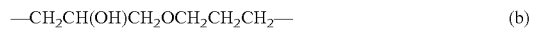

Among them, the structure of formula (b) will provide a more flexible polymer.

n represents a natural number of 1 to 1000. Polymer systems with a desirable balance of oxygen permeability and compatibility with hydrophilic monomers and polymers can be readily obtained when n is 1 to 50, preferably 2 to 30, 3 to 12. Any of the preferred lower limit values and any of the preferred upper limit values can be combined together. Furthermore, preferably n has no distribution in order to increase the reproducibility of the physical properties of the copolymer obtained. In the present invention, the phrase "no distribution" means that a single peak in the spectra accounts for at least 80% of the values of n, as measured by (a) GC the monomer can be measured using gas chromatography (GC) (FID analyzer), or (b) liquid chromatography (LC) (RI analyzer) for monomer having a high boiling point that cannot be measured using GC.

$R^{15}$ represents a $C_1$ to $C_{20}$ alkyl which may be substituted, or a $C_6$ to $C_{20}$ aryl which may be substituted. The substituted groups of the alkyl are halogen (F, Cl, Br, I), hydroxyl, amino, ether, carboxyl, ester, amide, sulfonyl, phenyl, and naphthyl. The substituted groups of the aryl are halogen (F, Cl, Br, I), hydroxyl, amino, ether, carboxyl, ester, amide, sulfonyl, C1-C6 alkyl, phenyl, and naphthyl. As the number of carbons in the alkyl groups increase, the volume fraction of silicon atoms may relatively decrease, leading to a reduction in oxygen permeability of the copolymer. Thus, in embodiments where oxygen permeabilities greater than about 80 or 100 barrers are desired an alkyl having 1 to 10 carbon atoms or an aryl having 6 to 10 carbon atoms is more preferable, an alkyl having 1 to 6 carbon atoms is further preferable. When $R^{15}$ is methyl, the polymers may display reduced stability, particularly when a carboxylic acid is included as a monomeric or polymeric component in the reaction mixture. In this embodiment $R^{15}$ may be selected from $C_2$-$C_4$ alkyl groups.

Where the mono-functional linear silicone (meth)acrylamide monomer is selected to provide compatibility to a system comprising both hydrophilic and hydrophobic components, at least one of $R^8$ and $X^2$ has at least one hydroxy group.

The minimum amount of mono-functional silicone (meth)acrylamide monomer used in the reactive mixtures of the present invention are about 30 parts by mass, 40 parts by mass, and in some embodiments 49 parts by mass. When the mono-functional silicone (meth)acrylamide monomer is present in amounts below those specified, the oxygen permeability of the resulting copolymer may be insufficient. If the amount of mono-functional silicone (meth)acrylamide monomer is too great, the hydrophilicity of the resulting copolymer may be undesirable. Accordingly, the upper amount of mono-functional silicone (meth)acrylamide monomer are 98 parts by mass, 80 parts by mass, and in some embodiments 65 parts by mass. The foregoing upper and lower ranges may be combined in any combination.

When copolymers comprising at least about 10 wt % water, and in some embodiments at least about 20% water are desired the reaction mixture of the present invention comprises at least one hydrophilic monomer.

Examples of suitable hydrophilic monomers are known in the contact lens art and include (meth)acrylamide monomers such as acrylamide, methacrylamide, N,N-dimethyl acrylamide (hereinafter referred to as DMA), N,N-dimethyl methacrylamide, 2-hydroxyethyl methacrylamide, 2-hydroxyethyl acrylamide; (meth)acrylate monomers such as 2-hydroxyethyl acrylate, glycerol methacrylate, polyethylene glycol monomethacrylate; N-vinyl carboxylic amides such as N-vinylpyrrolidone (NVP), N-vinyl-N-methylacetamide, N-vinyl-N-ethylacetamide, N-vinyl-N-methylformamide, N-vinyl-N-ethylformamide, N-vinylacetamide, N-vinylformamide; N-vinyl carbamates such as N-2-hydroxyethylvinyl carbamate; N-vinyl esters such as N-carboxy-carboxy-β-alanine; hydrophilic N-vinyl carbonates; methacrylic acid, acrylic acid; a reactive polyethylene polyol, a hydrophilic oxazolone monomer, a hydrophilic oxazoline monomer and a combination thereof. Among them, the (meth)acrylamide monomers are preferable in terms of improvement of the polymerization rate. In some embodiments acrylamide monomers are more preferred, and the DMA is most preferable.

If the amount of the hydrophilic monomer that is used is too high, the oxygen permeability will be reduced, but if too low, the resulting copolymer will be too hard, and therefore the amount of the hydrophilic monomer in this embodiment is between about 1 and about 50 mass %, more preferably between about 10 and about 40 mass %, and most preferably between 15 and 35 mass %, based on the monomer and polymer component in the polymerization mixture. Lower limit values are about 1 mass %, about 10 mass %, and about 15 mass %. Upper limit values are about 50 mass %, about 40 mass %, and about 35 mass %. Any of the lower limit values and any of the upper limit values can be combined together.

If it is desired to improve the transparency of the resulting copolymer, a (meth)acrylamide monomer having two or more hydroxyl groups and no siloxanyl groups within a molecule may be included in the reaction mixture in addition to the hydrophilic monomer. These multihydroxy-containing (meth)acrylamide monomers may replace all or part of the hydrophilic monomer in the reaction mixture. Examples of suitable multihydroxy-containing (meth)acrylamide monomers include monomers represented by the following general formulae (d1) to (d4).

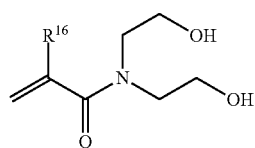

(d1)

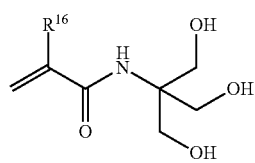

(d2)

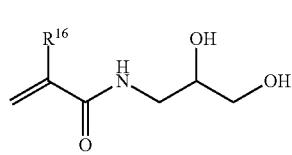

(d3)

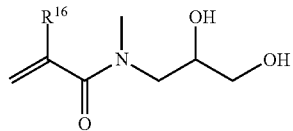

(d4)

In formulae (d1) to (d4), $R^{16}$ each independently represents hydrogen or methyl. In some embodiments, hydrogen may be preferable in terms of further improvement of the polymerization rate. Furthermore, among these monomers, most preferable are monomers represented by formula (d1) in terms of the transparency of the resulting copolymer.

The content of monomers having reactive functionality other than (meth)acrylamide functionality is preferably small to provide a faster polymerization rate overall and polymerization rates of copolymerization components which are equalized, to thereby obtain a copolymer having a uniform composition. The mass percent of radically polymerizable components having (meth)acrylamide functionality is preferably 90% by mass or greater, more preferably 95% by mass or greater, most preferably 97% by mass or greater based on the mass of all radically polymerizable components.

When the copolymer of the present invention is obtained by polymerization, at least one initiator may be added. Suitable initiators include thermal initiators and photoinitiators. When thermal polymerization is carried out, a thermal polymerization initiator having an optimum degradation characteristic at a desired reaction temperature is selected and used. Generally, an azo initiator and a peroxide initiator having a ten-hour half-life temperature of 40° C. to 120° C. is preferred. Suitable examples of thermal initiators include peroxide and azo compounds such as lauroyl peroxide, benzoyl peroxide, isopropyl percarbonate, azobisisobutyronitrile, and the like.

In one embodiment, the reaction mixtures of the present invention comprise at least one photoinitiator. The use of photoinitiation provides desirable cure times (time to reach essentially complete cure) of less than about 30 minutes, less than about 20 minutes and in some embodiments less than about 15 minutes. The photoinitiators may include carbonyl compounds, peroxides, azo compounds, sulfur compounds, halogen compounds and metal salts. Suitable photoinitiator systems include aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4,4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer, and in some embodiments from about 0.1 to about 1 parts by weight per 100 parts of reactive monomer.

When the copolymer of the present invention is obtained by polymerization, a polymerization solvent may be used. As a solvent, various kinds of organic and inorganic solvents can be applied. Examples thereof include water, various kinds of alcohol solvents such as methanol, ethanol, propanol, 2-propanol, butanol, tert-butanol, tert-amyl alcohol, 3,7-dimethyl-3-octanol, various kinds of aromatic hydrocarbon solvents such as benzene, toluene and xylene, various kinds of aliphatic hydrocarbon solvents such as hexane, heptane, octane, decane, petroleum ether, kerosene, ligroin and paraffin, various kinds of ketones such as acetone, methyl ethyl ketone and methyl isobutyl ketone, various kinds of ester solvents such as ethyl acetate, butyl acetate, methyl benzoate, dioctyl phthalate and ethylene glycol diacetate, and various kinds of glycol ether solvents such as diethyl ether, tetrahydrofuran, dioxane, ethylene glycol dialkyl ether, diethylene glycol dialkyl ether, triethylene glycol dialkyl ether, tetraethylene glycol dialkyl ether, polyethylene glycol dialkyl ether, polyethylene glycol-polypropylene glycol block copolymers, polyethylene glycol-polypropylene glycol random copolymers, and they may be used alone or in mixture. Additional diluents useful for this invention are disclosed in U.S. Pat. No. 6,020,445, which is incorporated herein by reference. Among them, alcohol solvents and glycol ether solvents are preferable in a sense that the solvent can be easily removed from the resulting copolymer by washing with water.

The copolymer of the present invention may be molded alone into a desired shape and used, or may be mixed with other materials and then molded. Furthermore, the copolymers of the present invention may also be coated on the surface of a molded product.

Applications of the copolymer of the present invention include ophthalmic lenses, endoscopes, catheters, transfusion tubes, gas transport tubes, stents, sheaths, cuffs, tube connectors, access ports, drainage bags, blood circuits, wound covering materials and various kinds of medicine carriers, but the copolymer of the present invention is particularly suitably used for ophthalmic lenses such as contact lenses, intraocular lenses, artificial corneas, cornea inlays and cornea onlays, and is most suitably for contact lenses.

When the copolymer of the present invention is molded and used as an ophthalmic lens, the following methods may be used as methods for polymerization and molding thereof: a method of molding the copolymer into a round bar or plate and processing the same into a desired shape by cutting, lathing or the like, a mold polymerization method and a spin casting method.

A case where an ophthalmic lens comprised of the copolymer of the present invention is obtained by the mold polymerization method will now be described as an example.

A reactive mixture composition is dispensed in a gap formed between two molds halves having a lens shape. Photo polymerization or thermal polymerization is then carried out to form the composition into a lens shape. The molds may be made of resin, glass, ceramic, metal or the like but in the case of photo polymerization, an optically transparent material, usually resin or glass, is used. Subsequently, the filled molds are irradiated with visible light, UV light or a combination thereof, or placed in an oven or a liquid bath and heated to polymerize the reactive mixture. Photo polymerization may also be combined with thermal polymerization such that thermal polymerization is performed before or after photo polymerization. In the case of photo polymerization, the wavelength of the light source is selected based upon the activation wavelength of the initiator. When thermal polymerization is performed, conditions of gradually raising the temperature from around 23° C. to 60° C. to 200° C. over several hours or several tens of hours are preferred as optical homogeneity and quality of the polymer are retained and repeatability is improved.

The copolymer of the present invention can be subjected to modification by various methods. When an ophthalmic lens is intended and no hydrophilic polymer is included internally, modification for improving the wettability of the surface may be carried out.

Specific modification methods may include irradiation of electromagnetic waves (including light), plasma irradiation, chemical vapor deposition processes such as vapor deposition and sputtering, heating, base treatments, acid treatments, use of other appropriate surface treatment agents and a combination thereof.

One example of the base treatment or acid treatment is a method of contacting a molded product with a basic or acidic solution, a method of contacting a molded product with a basic or acidic gas, or the like. More specific methods may include, for example, a method of immersing a molded product in a basic or acidic solution, a method of spraying a basic or acidic solution or a basic or acidic gas to a molded product, a method of coating a basic or acidic solution on a molded product by a knife or brush, and a spin coating method or dip coating method of applying a basic or acidic solution to a molded product. A method providing a significant modification effect in the simplest manner is the method of immersing a molded product in a basic or acidic solution.

The temperature at which the copolymer is immersed in a basic or acidic solution is not particularly limited, but is normally in the range of about −50° C. to 300° C. When considering workability, the temperature may be in the range of −10° C. to 150° C., or −5° C. to 60° C.

Time for immersing the copolymer in a basic or acidic solution is, generally 100 hours or less, 24 hours or less, 12 hours or less or 4 hours or less although optimum time varies depending on the temperature. Too long contact time may not only deteriorate workability and productibity but also have detrimental effects such as a reduction of oxygen permeability and degradation in mechanical properties.

As a base, alkali metal hydroxides, alkali earth metal hydroxides, various kinds of carbonates, various kinds of borates, various kinds of phosphates, ammonia, various kinds of ammonium salts, various kinds of amines, polymer bases such as polyethyleneimine and polyvinylamine and the like can be used. Among them, alkali metal hydroxides are most preferable because of the low cost and high treatment effect.

As an acid, various kinds of inorganic acids such as sulfuric acid, phosphoric acid, hydrochloric acid and nitric acid, various kinds of organic acids such as acetic acid, formic acid, benzoic acid and phenol and various kinds of polymer acids such as polyacrylic acid and polystyrene sulfonic acid can be used. Among them, polymer acids are most preferable because of the high treatment effect and no detrimental effects on other properties.

As a solvent of a basic or acidic solution, various kinds of inorganic and organic solvents may be used. The solvents include, for example, water, various kinds of alcohols such as methanol, ethanol, propanol, 2-propanol, butanol, ethylene glycol, diethylene glycol, triethylene glycol, tetraethylene glycol and polyethylene glycol glycerine, various kinds of aromatic hydrocarbons such as benzene, toluene and xylene, various kinds of aliphatic hydrocarbons such as hexane, heptane, octane, decane, petroleum ether, kerosene, ligroin and paraffin, various kinds of ketones such as acetone, methyl ethyl ketone and methyl isobutyl ketone, various kinds of esters such as ethyl acetate, butyl acetate, methyl benzoate and dioctyl phthalate, various kinds of ethers such as diethyl ether, tetrahydrofuran, dioxane, ethylene glycol dialkyl ether, diethylene glycol dialkyl ether, triethylene glycol dialkyl ether, tetraethylene glycol dialkyl ether and polyethylene glycol dialkyl ether, various kinds of polar aprotic solvents such as dimethylformamide, dimethylacetamide, N-methyl-2-pyrrolidone, dimethyl imidazolidinone, hexamethyl phosphoric triamide and dimethyl sulfoxide, halogen solvents such as methylene chloride, chloroform, dichloroethane, trichloroethane and trichloroethylene. Among them, water is most preferable in terms of economic efficiency, easy handling, chemical stability and the like. As the solvent, a mixture of two or more substances can also be used.

The basic or acidic solution for use in the present invention may contain components other than a basic or acidic substance and a solvent.

After the copolymer is subjected to a base treatment or acid treatment, a basic or acidic substance can be removed by washing.

As a washing solvent, various kinds of inorganic and organic solvents may be used. The solvents include, for example, water, various kinds of alcohols such as methanol, ethanol, propanol, 2-propanol, butanol, ethylene glycol, diethylene glycol, triethylene glycol, tetraethylene glycol, polyethylene glycol and glycerine, various kinds of aromatic hydrocarbons such as benzene, toluene and xylene, various kinds of aliphatic hydrocarbons such as hexane, heptane, octane, decane, petroleum ether, kerosene, ligroin and paraffin, various kinds of ketones such as acetone, methyl ethyl ketone and methyl isobutyl ketone, various kinds of esters such as ethyl acetate, butyl acetate, methyl benzoate and dioctyl phthalate, various kinds of ethers such as diethyl ether, tetrahydrofuran, dioxane, ethylene glycol dialkyl ether, diethylene glycol dialkyl ether, triethylene glycol dialkyl ether, tetraethylene glycol dialkyl ether and polyethylene glycol dialkyl ether, various kinds of polaraprotic solvents such as dimethylformamide, dimethylacetamide, N-methyl-2-pyrrolidone, dimethyl imidazolidinone, hexamethyl phosphoric triamide and dimethyl sulfoxide, halogen solvents such as methylene chloride, chloroform, dichloroethane, trichloroethane and trichloroethylene, and fluoro solvents.

As the washing solvent, a mixture of two or more solvents can also be used. The washing solvent may contain components other than a solvent, for example, inorganic salts, surfactants and washing agents. Aqueous washing solvents containing at least about 50%, 75% or 90% water may be used.

The abovementioned modification may be applied to the entire copolymer or may be applied to a part of the copolymer such as, for example, only the surface. When the modification is applied to only the surface, only the wettability of the surface can be improved without significantly changing the properties of the entire copolymer.

The water content of the copolymer of the present invention is desirably 20 weight % or greater, preferably 25 weight % or greater, more preferably 30 weight % greater. If the water content is too high, the article may dehydrate from an article, such as a contact lens, during use. In these embodiments, depending upon the other components it may be desirable for the water content to be less than 75 weight %, less than about 60 wt. These ranges may be combined in any combination.

Here, the water content is given by $$[((\text{mass in wet state}) = (\text{mass in dry state}))/(\text{mass in wet state})] \times 100$$

In this description, the wet state refers to a state after immersing a sample in pure water or a borate buffer at room temperature (23° C.) for 24 hours or longer. Measurements of physical properties in the wet state are made as soon as possible after the sample is taken out from pure water or a borate buffer.

In the description, the dry state refers to a state after drying in a vacuum drier at 40° C. for 16 hours or longer.

When an ophthalmic lens, particularly a soft contact lens is intended, the Young's modulus of the copolymer of the present invention is about 150 psi or less, about 110 psi or less, about 100 psi or less, 95 psi or less for affording good comfort.

The elasticity (elongation) of the copolymer of the present invention is generally about 250% or greater, about 270% or greater, or about 300% or greater as the copolymer is hard to be broken if the elasticity is high.

The elastic modulus and elasticity are measured on a hydrated sample using the following method. A sample is cut from the center of a −1.00 lens, where the width of the narrowest section is 5 mm, and then stretching at a rate of 100 mm/minute and a temperature of 25° C. using a tensile tester until it breaks. The initial gauge length of the sample (Lo) and sample length at break (Lf) are measured. Twelve specimens of each composition are measured and the average is reported. Tensile modulus is measured at the initial linear portion of the stress/strain curve.

$$\text{Percent elongation is} = [(Lf-Lo)/Lo] \times 100.$$

In the present invention, low "formulation stability" means that, when the amount of crosslinker is changed slightly (0.1 part by mass change), mechanical properties such as modulus and elongation change substantially, for example by more than about 11 psi change in modulus, or 40% change in elongation with. Copolymers with low formulation stability display poor reproducibility of mechanical properties, and are thus not suitable for commercial production of medical devices, such as contact lenses.

Copolymers of the present invention having high formulation stability will have absolute values of the slope of modulus/parts by mass of crosslinker (hereinafter referred to as SMC value) of 90 or lower, 70 or lower, or 50 or lower.

Alternatively, high formulation stability copolymers of the present invention may be characterized by the absolute value of the slope of elongation/parts by mass (hereinafter referred to as SEC value) of crosslinker of the copolymer. Desirable SEC values include 220 or lower, 200 or lower, or 150 or lower.

Examples of component ranges which provide copolymers having desirable SMC and SEC values are shown in Table 1, below.

TABLE 1

| Component | Parts by mass | | |
|---|---|---|---|
| mono-functional linear silicone (meth)acrylamide monomer | 40-80 | 49-65 | 50-60 |
| non-silicone hydrophilicmonomer | 10-40 | 15-35 | 20-30 |
| multihydroxyl-containing (meth)acrylamide monomer | 2-30 | 3-20 | 4-10 |
| Hydrophilic polymer | 0-25 | 3-20 | 4-10 |
| Initiator | 0.1-2 | 0.1-1 | 0.1-0.5 |
| UV absorber | 0-4 | 0-3 | 0-2.5 |

The total parts by mass of the components described above is 98.8 parts by mass.

The formulations above may also include one or more polymerization solvents and optional components including one or more crosslinkers, medicinal agents, antimicrobial compounds, copolymerizable and nonpolymerizable dyes, including dyes and compounds which reversibly change color or reflect light when exposed to various wavelengths of light, polymeric wetting agents which may optionally contain at last one radically polymerizable group, release agents, reactive tints, pigments, combinations thereof and the like.

When an ophthalmic lens is intended, the advancing contact angle of the copolymer of the present invention may be about 70° or less, about 60° or less, or 50° or less. The dynamic contact angle is measured in a sample in a wet state by a borate buffer with respect to the borate buffer.

For the oxygen permeability of the copolymer of the present invention, the oxygen permeability coefficient may be about $70 \times 10^{-11}$ (cm$^2$/sec) mL O$_2$/(mL·hPa) or greater. The oxygen permeability coefficient is measured in a sample in a wet state by pure water.

For the transparency of the copolymer of the present invention, when an ophthalmic lens is intended, the transmissivity in a water-containing state of the ophthalmic lens is about 85% or greater, about 88% or greater, about 91% or greater.

For the transparency of the copolymer of the present invention by visual observations, in the case of the evaluation method described in examples below, A or B, of evaluation criteria A to D, is preferable, and A is more preferable.

For the shape of the copolymer of the present invention by visual observations, in the case of the evaluation method described in examples below, A or B, of evaluation criteria A to C, is preferable, and A is more preferable.

The copolymer of the present invention is suitable as a material for medical device and more specifically, especially suitable for medical devices such as ophthalmic lenses, endoscopes, catheters, transfusion tubes, gas transport tubes, stents, sheaths, cuffs, tube connectors, access ports, drainage bags, blood circuits, wound covering materials and various kinds of medicine carriers, particularly contact lenses, intraocular lenses, artificial corneas and the like.

[Example]

The present invention will now be described in detail by examples, but the present invention is not thereby limited.

Measurement Methods

In this description, the borate buffer refers to the "salt solution" described in Example 1 of National Publication of International Patent Application No. 2004-517163. Specifically, the borate buffer is an aqueous solution prepared by dissolving 8.48 g of sodium chloride, 9.26 g of boric acid, 1.0 g of sodium borate (sodium tetraborate decahydrate) and 0.10 g of ethylene diamine tetraacetic acid in pure water to make up 1000 mL volume.

(1) Transmissivity

Measurements were made using SM Color Computer (Model SM-7-CH manufactured by Suga Test Instruments Co., Ltd.). Water on a lens-shaped sample was lightly wiped off and the sample was set on an optical path to make a measurement. The thickness was measured using ABC Digimatic Indicator (ID-C112 manufactured by Mitutoyo Corporation), and samples having a thickness of 0.14 to 0.15 mm were used for the measurement.

(2) Elastic Modulus, Tensile Elongation (Rupture Elongation)

A hydrated sample (in borate buffer) was used to make a measurement. A specimen having a width (minimum part) of 5 mm, a length of 14 mm and a thickness of 0.2 mm was cut out from a contact lens-shaped sample using a cutting die. With the specimen, a tensile test was carried out at 25° C. using RTG-1210 Model Tester (Load Cell UR-10N-D Model) manufactured by Orientec Co., Ltd. The tensile speed was 100 mm/minute and the distance between grips (initial) was 5 mm. Furthermore, in the case of a film-shaped sample, a measurement was made in the same manner using a specimen having a size of about 5 mm×20 mm×0.1 mm.

(3) Water Content

A contact lens-shaped specimen was used. The specimen was immersed in a borate buffer and left standing in a temperature-controlled room at 23° C. for 24 hours or longer to absorb water, followed by wiping off surface water with a wiping cloth ("Kimwipes" (registered trademark) manufactured by NIPPON PAPER CRECIA Co., LTD.) and measuring the mass (Ww). Thereafter, the specimen was dried in a vacuum drier at 40° C. for 16 hours, and the mass (Wd) was measured. The water content was determined from the following equation. Water content (% by mass)=100×(Ww−Wd)/Ww (4) Dynamic Contact Angle A measurement was made with a sample in a wet state by a borate buffer. Using as a dynamic contact angle a film-shaped specimen having a size of about 5 mm×10 mm×0.1 mm, which was cut out from a sample molded in a film form or a strip-shaped specimen having a width of 5 mm, which was cut out from a contact lens-shaped sample, the dynamic contact angle at advance with respect to a borate buffer was measured at 25° C. The immersion rate was 0.1 mm/sec and the immersion depth was 7 mm.

(5) Stress Zero Time

A measurement was made with a sample in a wet state by a borate buffer. A strip-shaped sample having a width of 5 mm and a length of about 1.5 cm was cut out from a lens at or near its center, and a measurement was made using Rheometer CR-500 DX manufactured by Sun Scientific Co., Ltd.). The sample was attached to a chuck with a width set to 5 mm and drawn over a distance of 5 mm at a speed of 100 mm/minute, followed by returning the sample to an initial length (5 mm) at the same speed. The measurement was repeated three times. The length of time between a time point at which the stress became zero in the course of returning the sample to the initial length at the second repetition and a time point at which the stress emerged (no longer zero) after starting drawing at the third repetition was determined and designated as a stress zero time. It is shown that the shorter the stress zero time, the better the shape recovery of a silicone hydrogel, and the stress zero time is preferably 2 seconds or less, more preferably 1.5 seconds or less, most preferably 1.2 seconds or less.

(6) Transparency

The transparency of a sample in a hydrated state (borate buffer) was visually observed, and was evaluated according to the following criteria.
A: transparent with no turbidity
B: white turbidness at some midpoint between A and C
C: translucent with slight turbidity
D: no transparency with white turbidness
(7) Shape The shape of a sample in a wet state by a borate buffer was visually observed, and was evaluated according to the following criteria.
A: good shape with no distortion
B: distortion at some midpoint between A and C
C: poor shape with distortion
(8) SMC Value At least two data points of modulus (psi) which are less than 300 psi are plotted versus parts by mass of crosslinker in a graph. A line is made between the two data points if two data points were plotted, or a line is made by least mean squares method if three or more data points were plotted. The preferred number of data points is two to four, and more preferred number is three. The absolute value of slope of the line is SMC value.
(9) SEC Value At least two data points of elongation (%) which are more than 50% are plotted versus parts by mass of crosslinker in a graph. A line is made between the two data points if two data points were plotted, or a line is made by least mean squares method if three or more data points were plotted. The preferred number of data points is two to four, and more preferred number is three. The absolute value of slope of the line is SEC value.

SYNTHESIS EXAMPLES

Synthesis Example 1

In a 200 mL three-necked flask, 2 g of 1,3-bis(3-aminopropyl)tetramethyl siloxane (8.0 mmol, product name: LS-7430) manufactured by Shin-Etsu Chemical Co., Ltd., 1.62 g (16 mmol) of triethylamine and 50 mL of ethyl acetate were each weighed and mixed. In a dropping funnel, 1.45 g (16 mmol) of acryloyl chloride and 50 mL of ethyl acetate were weighed and mixed. The flask was set in an ice salt bath and the mixture was added dropwise at −5 to 0° C. for 2 hours and 30 minutes. The reaction was traced by gas chromatography with the dropping termination time as a start point. Disappearance of a raw material siloxane peak was observed at a reaction time of 0 hour, and therefore the reaction was terminated. By filtration using a Kiriyama funnel (Kiriyama glass works Co), a precipitate deposited in the reaction was removed while washing with ethyl acetate. The filtrate was concentrated in a water bath thermally controlled to 30° C. for about 10 minutes using a rotary evaporator. The resulting crude product was purified by a silica gel column (column solvent: hexane/ethyl acetate (1/3) mixed solvent (v/v)) to obtain a bisacrylamide (SiBA) represented by the following formula (S1)

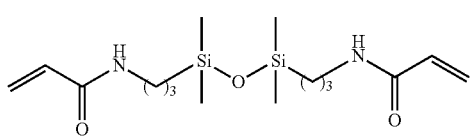

(S1)

Synthesis Example 2

In a 200 mL three-necked flask, 5 g of amino-modified silicone oil (5.8 mmol, dual-end type, product name: KF-8010, reactive group equivalent weight 430 g/mol) manufactured by Shin-Etsu Chemical Co., Ltd., 1.17 g (11.6 mmol) of triethylamine and 60 mL of ethyl acetate were each weighed and mixed. In a dropping funnel, 1.05 g (11.6 mmol) of acryloyl chloride and 60 mL of ethyl acetate were weighed and mixed. The flask was set in an ice salt bath and the mixture was added dropwise at −5 to 0° C. for 3 hours. Thereafter, the mixture was stirred at 0° C. to 5° C. for 3 hours. A deposited precipitate was removed by filtration while washing with ethyl acetate. Ethyl acetate was distilled away by a rotary evaporator for 5 minutes. Hexane was added to the resulting mixed solution, and the mixture was separately washed total six times with 100 mL of pure water (2×), 100 mL of aqueous sodium hydrogen carbonate solution (2×) and 100 mL of saturated aqueous sodium chloride solution (2×) in this order. It was confirmed by a pH indicator paper that an organic layer obtained by separate washing was neutral, and the organic layer was transferred to an Erlenmeyer flask. The organic layer was dehydrated by adding an appropriate amount of anhydrous sodium sulfate thereto, and anhydrous sodium sulfate was removed by filtration, followed by concentrating the organic layer in a water bath thermally controlled to 30° C. for about 10 minutes using a rotary evaporator. The resulting crude product was purified by a silica gel column (column solvent: hexane/ethyl acetate (1/1, 1/3) mixed solvent (v/v)) to obtain a bisacrylamide (SiBA 1000) represented by the following formula (S2)

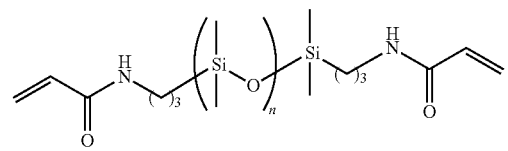

(S2)

Here, n in formula (S2) is a natural number, and the average molecular weight of the compound was about 1000.

Synthesis Example 3

In a 200 mL three-necked flask, 2 g (27 mmol) of 1,3-propanediamine manufactured by Wako Pure Chemical Industries, Ltd., 6.01 g (59.4 mmol) of triethylamine and 30 mL of ethyl acetate were each weighed and mixed. In a dropping funnel, 5.38 g (59.4 mmol) of acryloyl chloride and 30 mL of ethyl acetate were weighed and mixed. The flask was set in an ice salt bath and the mixture was added dropwise at −5 to 0° C. for 3 hours and 30 minutes. The reaction was traced by GC with the dropping termination time point as a start point. A 1,3-propanediamine peak almost disappeared at a reaction time of 3 hours, and therefore the reaction was terminated. By filtration using a Kiriyama funnel, a precipitate was removed while washing with ethyl acetate. 3,5-dibutyl-4-hydroxytoluene was added to the filtrate, and the mixture was concentrated in a water bath thermally controlled to 30° C. for about 20 minutes using a rotary evaporator. The resulting crude product was purified by a silica gel column (column solvent: ethanol/ ethyl acetate (1/20, 1/10) mixed solvent (v/v)) to obtain a bisacrylamide (C3) represented by the following formula (L1)
[Chemical Formula 10].

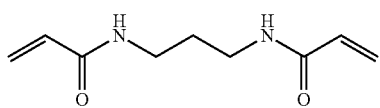

(L1)

Synthesis Example 4

In a 200 mL three-necked flask, 2 g (19.6 mmol) of 1,5-diaminopentane manufactured by Wako Pure Chemical Industries, Ltd., 4.35 g (43.0 mmol) of triethylamine, 50 mL of ethyl acetate and 10 mL of IPA were each weighed and mixed. In a dropping funnel, 3.89 g (43.0 mmol) of acryloyl chloride and 40 mL of ethyl acetate were weighed and mixed. The flask was set in an ice salt bath and the mixture was added dropwise at −5 to 0° C. for an hour and 20 minutes. The reaction was traced by GC with the dropping termination time as a start point. A 1,5-diaminopentane peak almost disappeared at a reaction time of 4 hours, and therefore the reaction was terminated. By filtration using a Kiriyama funnel, a precipitate was removed while washing with ethyl acetate. 3,5-dibutyl-4-hydroxytoluene was added to the filtrate, and the mixture was concentrated in a water bath thermally controlled to 30° C. for about 20 minutes using a rotary evaporator. The resulting crude product was purified by a silica gel column (column solvent: ethanol/ethyl acetate (1/20, 1/10) mixed solvent (v/v)) to obtain a bisacrylamide (C5) represented by the following formula (L2)

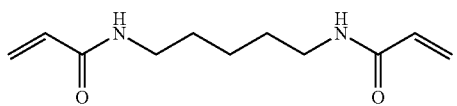

(L2)

Synthesis Example 5

In a 200 mL three-necked flask, 2 g (13.9 mmol) of N,N'-dimethyl-1,6-hexanediamine manufactured by Tokyo Chemical Industry Co., Ltd., 2.81 g (27.8 mmol) of triethylamine and 30 mL of ethyl acetate were each weighed and mixed. In a dropping funnel, 2.52 g (27.8 mmol) of acryloyl chloride and 50 mL of ethyl acetate were weighed and mixed. The flask was set in an ice salt bath and the mixture was added dropwise at −5 to 0° C. for 2 hours and 30 minutes. The reaction was traced by GC with the dropping termination time as a start point. A N,N'-dimethyl-1,6-hexanediamine peak almost disappeared at a reaction time of 4 hours, and therefore the reaction was terminated. By filtration using a Kiriyama funnel, a precipitate was removed while washing with ethyl acetate. 3,5-dibutyl-4-hydroxytoluene was added to the filtrate, and the mixture was concentrated in a water bath thermally controlled to 30° C. for about 20 minutes using a rotary evaporator. The resulting crude product was purified by a silica gel column (column solvent: chloroform/ethyl acetate (30/1, 20/1, 10/1.5/1)

mixed solvent (v/v)) to obtain a bisacrylamide (Me-C6) represented by the following formula (M1)
[Chemical Formula 12].

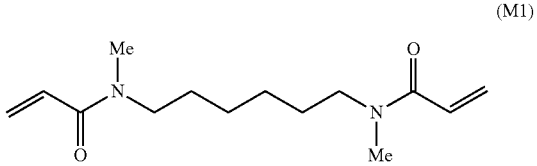 [SMILES: C=CC(=O)N(C)CCCCCCN(C)C(=O)C=C]

(M1)

Synthesis Example 6

In a 200 mL three-necked flask, 0.8 g (4.64 mmol) of N,N'-dimethyl-1,8-octanediamine manufactured by Sigma-Aldrich Corporation, 1.01 g (10 mmol) of triethylamine and 50 mL of ethyl acetate were each weighed and mixed. In a dropping funnel, 0.91 g (10 mmol) of acryloyl chloride and 50 mL of ethyl acetate were weighed and mixed. The flask was set in an ice salt bath and the mixture was added dropwise at −5 to 0° C. for an hour. The reaction was traced by GC with the dropping termination time as a start point. Disappearance of an N,N'-dimethyl-1,8-octanediamine peak was observed at a reaction time of 0 hour, and therefore the reaction was terminated. By filtration using a Kiriyama funnel, a precipitate was removed while washing with ethyl acetate. 3,5-dibutyl-4-hydroxytoluene was added to the filtrate, and the mixture was concentrated in a water bath thermally controlled to 30° C. for about 10 minutes using a rotary evaporator. The resulting crude product was purified by a silica gel column (column solvent: ethanol/ethyl acetate (1/20, 1/10) mixed solvent (v/v)) to obtain a bisacrylamide (Me-C8) represented by the following formula (M2)
[Chemical Formula 13].

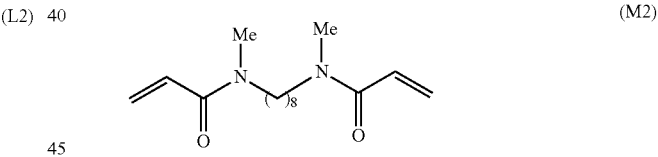

(M2)

Synthesis Example 7

In a 200 mL three-necked flask, 1 g (5.67 mmol) of 1,8-bis(methylamino)-3,6-dioxaoctane manufactured by Acros Organics, 1.15 g (11.34 mmol) of triethylamine and 15 mL of ethyl acetate were each weighed and mixed. In a dropping funnel, 1.03 g (11.34 mmol) of acryloyl chloride and 15 mL of ethyl acetate were weighed and mixed. The flask was set in an ice salt bath and the mixture was added dropwise at −5 to 0° C. for an hour. The reaction was traced by GC with the dropping termination time as a start point. A 1,8-bis(methylamino)-3,6-dioxaoctane peak almost disappeared at a reaction time of an hour, and therefore the reaction was terminated. By filtration using a Kiriyama funnel, a precipitate was removed while washing with ethyl acetate. 3,5-dibutyl-4-hydroxytoluene was added to the filtrate, and the mixture was concentrated in a water bath thermally controlled to 30° C. for about 10 minutes using a rotary evaporator. The resulting crude product was purified by a silica gel column (column solvent: ethanol/ethyl acetate (1/3, 1/5) mixed solvent (v/v)) to obtain a bisacrylamide (Me-3G) represented by the following formula (M3)

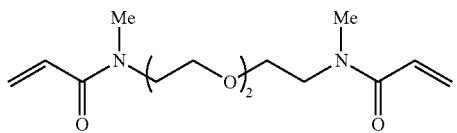

(0.462 g, 56.06 parts by weight), DMA (0.208 g, 25.27 parts by weight), a non-silicone acrylamide monomer represented by the following formula (H1)

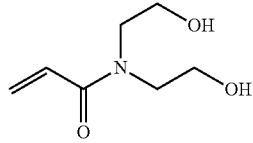

(0.058 g, 7 parts by weight), polyvinyl pyrrolidone (PVP K90, 0.066 g, 8 parts by mass), a UV absorber 2-(2'-hydroxy-5'-methacryloyloxyethylphenyl)-2H-benzotriazole (0.018 g, 2.22 parts by mass), t-amyl alcohol (TAA, 0.681 g) and a photoinitiator Irgacure 819 (0.002 g, 0.25 part by mass) were mixed and stirred. The resulting monomer mixture was degassed in argon environment. In a glove box in a nitrogen environment, the monomer mixture was filled in a gap of a mold made of transparent resin having a lens shape (front curve side: ZEONOR, base curve side: polypropylene), and irradiated with light (Philips TL 03, 1.6 mW/cm², 15 minutes) and thereby photo-polymerized to obtain a lens. The lens obtained was immersed in a 70% (volume ratio) 2-propanol (IPA) aqueous solution at 23° C. for 70 minutes to thereby demold the lens from the mold and extract impurities such as residual monomers. The lens was immersed in water for 10 minutes, and thereafter immersed in a borate buffer (pH 7.1 to 7.3) in a 5 mL vial, and the vial was placed in an autoclave and boiled at 120° C. for 30 minutes.

The transmissivity, water content, modulus, elasticity and stress zero time of the obtained lens-shaped sample were as shown in Table 1, and lenses well extendable with a low modulus were obtained.

Example 1

The bisacrylamide SiBA (0.016 g, 2.0 parts by mass) obtained in Synthesis Example 1, a mono-functional linear silicone acrylamide monomer represented by the following formula (X1)

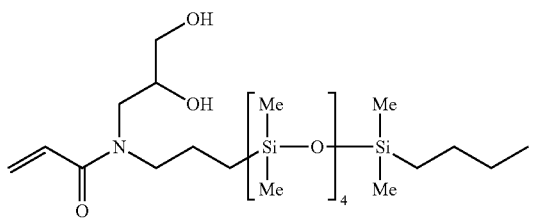

TABLE 1

| | | bisacrylamide | | | | | | stress | | |
| --- | --- | --- | --- | --- | --- | --- | --- | --- | --- | --- |
| | | parts by mass | mass average molecular weight | transmissivity (%) | water content (%) | modulus (psi) | elongation (%) | zero time (sec) | transparency | shape |
| Example 1 | Formula (S1) | 2.00 | 356 | 91.2 | 39.1 | 92.3 | 272.5 | 1.01 | A | A |
| Example 2 | Formula (S1) | 1.80 | 356 | 91.1 | 39.6 | 90.7 | 274.7 | 0.99 | B | B |
| Example 3 | Formula (S1) | 2.20 | 356 | 91.5 | 39.2 | 109.3 | 253 | 1.01 | A | A |
| Example 4 | Formula (S2) | 3.50 | 1000 | 92.5 | 38.7 | 106.1 | 292 | 0.88 | A | A |
| Example 5 | Formula (S2) | 2.50 | 1000 | 91.2 | 39.5 | 83.9 | 433.7 | 0.90 | B | A |
| Example 6 | Formula (S2) | 3.00 | 1000 | 92.3 | 38.5 | 94.5 | 312.4 | 0.91 | B | A |
| Comparative Example 1 | Formula (L1) | 1.10 | 182 | 91.4 | 38.5 | 124.3 | 187.4 | 0.84 | A | A |
| Comparative Example 2 | Formula (L1) | 0.90 | 182 | 92.5 | 39.6 | 102.1 | 267.7 | 0.85 | A | C |
| Comparative Example 3 | Formula (L1) | 1.00 | 182 | 92.2 | 39.5 | 112.2 | 214.2 | 0.94 | A | B |
| Comparative Example 4 | Formula (L2) | 0.90 | 210 | 90.2 | 42.1 | 71.2 | 346 | 0.96 | B | C |
| Comparative Example 5 | Formula (L2) | 1.10 | 210 | 90.9 | 39.4 | 91.2 | 235.6 | 0.92 | A | B |
| Comparative Example 6 | Formula (L2) | 1.50 | 210 | 90.9 | 37.6 | 126.9 | 191.3 | 0.89 | A | A |
| Comparative Example 7 | Formula (M1) | 0.90 | 252 | 91.5 | 38.5 | 91.8 | 275.8 | 1.07 | B | C |
| Comparative Example 8 | Formula (M1) | 1.10 | 252 | 91.6 | 37.9 | 121.7 | 215.6 | 0.94 | A | B |
| Comparative Example 9 | Formula (M1) | 1.80 | 252 | 91.9 | 35.5 | 186.1 | 137.4 | 0.91 | A | A |

Examples 2 and 3

A lens-shaped sample was obtained by carrying out polymerization in the same manner as in Example 1 except that the composition was changed as in Table 1. The appearance, transmissivity, water content, modulus, elasticity and stress zero time of the obtained lens-shaped sample were as shown in Table 1.

Example 4

A lens-shaped sample was obtained by carrying out polymerization in the same manner as in Example 1 except that SiBA 1000 obtained in Synthesis Example 2 was used as a bisacrylamide monomer instead of SiBA obtained in Synthesis Example 1 and the composition was changed as in Table 1. The appearance, transmissivity, water content, modulus, elasticity and stress zero time of the obtained lens-shaped sample were as shown in Table 1.

Examples 5 and 6

A lens-shaped sample was obtained by carrying out polymerization in the same manner as in Example 4 except that the composition was changed as in Table 1. The appearance, transmissivity, water content, modulus, elasticity and stress zero time of the obtained lens-shaped sample were as shown in Table 1.

Comparative Example 1

A lens-shaped sample was obtained by carrying out polymerization in the same manner as in Example 1 except that C3 obtained in Synthesis Example 3 was used as a bisacrylamide monomer instead of SiBA obtained in Synthesis Example 1 and the composition was changed as in Table 1. The appearance, transmissivity, water content, modulus, elasticity and stress zero time of the obtained lens-shaped sample were as shown in Table 1.

Comparative Examples 2 and 3

A lens-shaped sample was obtained by carrying out polymerization in the same manner as in Comparative Example 1 except that the composition was changed as in Table 1. The appearance, transmissivity, water content, modulus, elasticity and stress zero time of the obtained lens-shaped sample were as shown in Table 1.

Comparative Example 4

A lens-shaped sample was obtained by carrying out polymerization in the same manner as in Example 1 except that C5 obtained in Synthesis Example 4 was used as a bisacrylamide monomer instead of SiBA obtained in Synthesis Example 1 and the composition was changed as in Table 1. The appearance, transmissivity, water content, modulus, elasticity and stress zero time of the obtained lens-shaped sample were as shown in Table 1.

Comparative Examples 5 and 6

A lens-shaped sample was obtained by carrying out polymerization in the same manner as in Comparative Example 4 except that the composition was changed as in Table 1. The appearance, transmissivity, water content, modulus, elasticity and stress zero time of the obtained lens-shaped sample were as shown in Table 1.

Comparative Example 7

A lens-shaped sample was obtained by carrying out polymerization in the same manner as in Example 1 except that Me-C6 obtained in Synthesis Example 5 was used as a bisacrylamide monomer instead of SiBA obtained in Synthesis Example 1 and the composition was changed as in Table 2. The appearance, transmissivity, water content, modulus, elasticity and stress zero time of the obtained lens-shaped sample were as shown in Table 1.

Comparative Examples 8 and 9

A lens-shaped sample was obtained by carrying out polymerization in the same manner as in Comparative Example 7 except that the composition was changed as in Table 2. The appearance, transmissivity, water content, modulus, elasticity and stress zero time of the obtained lens-shaped sample were as shown in Table 1.

Comparative Example 10

A lens-shaped sample was obtained by carrying out polymerization in the same manner as in Example 1 except that Me-C8 obtained in Synthesis Example 6 was used as a bisacrylamide monomer instead of SiBA obtained in Synthesis Example 1 and the composition was changed as in Table 2. The appearance, transmissivity, water content, modulus, elasticity and stress zero time of the obtained lens-shaped sample were as shown in Table 2.

TABLE 2

| | bisacrylamide | | | | | | | | |
|---|---|---|---|---|---|---|---|---|---|
| | | parts by mass | mass average molecular weight | trans-missivity (%) | water content (%) | modulus (psi) | elongation (%) | stress zero time (sec) | trans-parency | shape |
| Comparative Example 11 | Formula (M2) | 1.00 | 280 | 92.3 | 39.7 | 94.7 | 241.8 | 0.89 | A | B |
| Comparative Example 12 | Formula (M2) | 1.10 | 280 | 91.5 | 39 | 100.7 | 228.9 | 0.95 | A | B |
| Comparative Example 13 | Formula (M2) | 2.00 | 280 | 92.0 | 36.8 | 232 | 106.4 | 0.82 | A | A |
| Comparative Example 14 | Formula (M3) | 1.10 | 284 | 91.1 | 39.5 | 79.4 | 280.8 | 1.03 | C | C |
| Comparative Example 15 | Formula (M3) | 1.30 | 284 | 89.1 | 38.5 | 99.2 | 304 | 0.89 | B | C |
| Comparative Example 16 | Formula (M3) | 1.50 | 284 | 90.2 | 37.6 | 117.2 | 277 | 0.95 | B | B |
| Comparative Example 17 | Formula (Y1) | 1.10 | 154 | 91.3 | 37.9 | 141 | 176.2 | 1.01 | A | A |
| Comparative Example 18 | Formula (Y2) | 0.80 | 224 | 91.5 | 39 | 90.7 | 322.7 | 0.95 | B | C |
| Comparative Example 19 | Formula (Y2) | 1.10 | 224 | 91.7 | 37.4 | 115.7 | 225 | 0.93 | A | B |

TABLE 2-continued

| | | bisacrylamide | | | | | | | | |
| | | parts by mass | mass average molecular weight | trans-missivity (%) | water content (%) | modulus (psi) | elongation (%) | stress zero time (sec) | trans-parency | shape |
| --- | --- | --- | --- | --- | --- | --- | --- | --- | --- | --- |
| Comparative Example 20 | Formula (Y3) | 0.90 | 200 | 83.4 | 52.2 | not analyzed | not analyzed | not analyzed | D | C |
| Comparative Example 21 | Formula (Y3) | 1.10 | 200 | 83.1 | 52.3 | not analyzed | not analyzed | not analyzed | D | B |
| Comparative Example 22 | Formula (Y3) | 1.40 | 200 | 83.1 | 51.6 | not analyzed | not analyzed | not analyzed | D | B |

Comparative Examples 11 to 13

A lens-shaped sample was obtained by carrying out polymerization in the same manner as in Comparative Example 10 except that the composition was changed as in Table 2. The appearance, transmissivity, water content, modulus, elasticity and stress zero time of the obtained lens-shaped sample were as shown in Table 2.

Comparative Example 14

A lens-shaped sample was obtained by carrying out polymerization in the same manner as in Example 1 except that Me-3G obtained in Synthesis Example 7 was used as a bisacrylamide monomer instead of SiBA obtained in Synthesis Example 1 and the composition was changed as in Table 2. The appearance, transmissivity, water content, modulus, elasticity and stress zero time of the obtained lens-shaped sample were as shown in Table 2.

Comparative Examples 15 and 16

A lens-shaped sample was obtained by carrying out polymerization in the same manner as in Comparative Example 14 except that the composition was changed as in Table 2. The appearance, transmissivity, water content, modulus, elasticity and stress zero time of the obtained lens-shaped sample were as shown in Table 2.

Comparative Example 17

A lens-shaped sample was obtained by carrying out polymerization in the same manner as in Example 1 except that a monomer represented by the following formula (Y1)

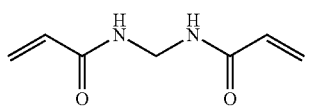

(Y1)

was used as a bisacrylamide monomer instead of SiBA obtained in Synthesis Example 1 and the composition was changed as in Table 2. The appearance, transmissivity, water content, modulus, elasticity and stress zero time of the obtained lens-shaped sample were as shown in Table 2.

Comparative Example 18

A lens-shaped sample was obtained by carrying out polymerization in the same manner as in Example 1 except that a monomer represented by the following formula (Y2)

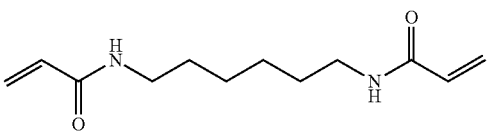

(Y2)

was used as a bisacrylamide monomer instead of SiBA obtained in Synthesis Example 1 and the composition was changed as in Table 2. The appearance, transmissivity, water content, modulus, elasticity and stress zero time of the obtained lens-shaped sample were as shown in Table 2.

Comparative Example 19

A lens-shaped sample was obtained by carrying out polymerization in the same manner as in Comparative Example 18 except that the composition was changed as in Table 2. The appearance, transmissivity, water content, modulus, elasticity and stress zero time of the obtained lens-shaped sample were as shown in Table 2.

Comparative Example 20

A lens-shaped sample was obtained by carrying out polymerization in the same manner as in Example 1 except that a monomer represented by the following formula (Y3)
[Chemical Formula 19]

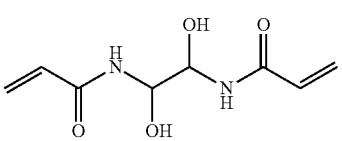

(Y3)

was used as a bisacrylamide monomer instead of SiBA obtained in Synthesis Example 1 and the composition was changed as in Table 2. The physical properties of the obtained sample were as shown in Table 2.

Comparative Examples 21 and 22

A lens-shaped sample was obtained by carrying out polymerization in the same manner as in Comparative Example 20 except that the composition was changed as in Table 2. The physical properties of the obtained sample were as shown in Table 2.

INDUSTRIAL APPLICABILITY

The present invention relates to a silicone hydrogel, and the silicone hydrogel is especially suitably used for contact lenses, intraocular lenses, artificial corneas and the like.

The invention claimed is:

1. A copolymer formed from a reactive mixture comprising radically polymerizable components comprising (A) a multi-functional (meth)acrylamide monomer having at least one siloxane bond and at least two (meth)acrylamide groups within a molecule and (B) a mono-functional linear silicone (meth)acrylamide monomer of formula (P1)

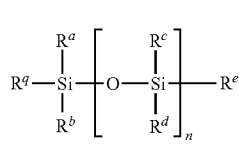
(P1)

where $R^q$ comprises a (meth)acrylamide group containing no silicon atom; $R^a$ to $R^e$ contain no silicon atoms, and are independently selected from substituted or unsubstituted alkyl groups having 1 to 20 carbon atoms, or substituted or unsubstituted aryl groups having 6 to 20 carbon atoms, and n represents an integer of 1 or greater,
wherein the substituted groups of alkyl, when present, are selected from halogen, hydroxyl, amino, ether, carboxyl, ester, amide, sulfonyl, phenyl, and naphthyl, and wherein the substituted groups of aryl, when present, are selected from halogen, hydroxyl, amino, ether, carboxyl, ester, amide, sulfonyl, C1-C6 alkyl, phenyl, and naphthyl.

2. The copolymer according to claim 1, wherein the multi-functional (meth)acrylamide monomer has two (meth)acrylamide groups.

3. The copolymer according to claim 2, wherein the multi-functional (meth)acrylamide monomer is represented by Formula (a1):

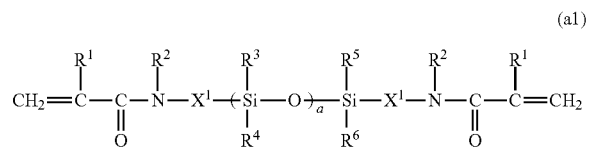
(a1)

wherein $R^1$ is independently selected from hydrogen and methyl;
$R^2$ is independently selected from hydrogen, or an alkyl which may be substituted and has 1 to 20 carbon atoms, or an aryl which may be substituted and has 6 to 20 carbon atoms;
$R^3$ to $R^6$ are each an alkyl which may be substituted and has 1 to 20 carbon atoms, or an aryl which may be substituted and has 6 to 20 carbon atoms;
$X^1$ is independently selected from substituted or unsubstituted divalent organic groups having 1 to 20 carbon atoms; and
a represents an integer of 1 to 15,
wherein the substituted groups of alkyl, when present, are selected from halogen, hydroxyl, amino, ether, carboxyl, ester, amide, sulfonyl, phenyl, and naphthyl, and wherein the substituted groups of aryl, when present, are selected from halogen, hydroxyl, amino, ether, carboxyl, ester, amide, sulfonyl, C1-C6 alkyl, phenyl, and naphthyl.

4. The copolymer according to claim 1, wherein the mass average molecular weight of the multi-functional (meth)acrylamide monomer is 1500 or less.

5. The copolymer according to claim 1, wherein the mono-functional linear silicone (meth)acrylamide monomer has at least one hydroxy group.

6. The copolymer according to claim 1, wherein the mono-functional linear silicone (meth)acrylamide monomer is represented by general formula (a2)

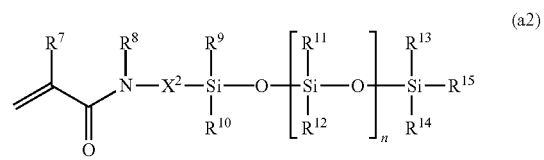
(a2)

wherein $R^7$ is one selected from hydrogen and methyl; $R^8$ is hydrogen, an alkyl which may be substituted with a hydroxy group and has 1 to 20 carbon atoms, or an aryl which may be substituted with a hydroxy group and has 6 to 20 carbon atoms; $R^9$ to $R^{14}$ are each an alkyl which may be substituted and has 1 to 20 carbon atoms, or an aryl which may be substituted and has 6 to 20 carbon atoms; $X^2$ represents a $C_1$-$C_{20}$ alkylene group which may be substituted with a hydroxy group; n is 1 to 1000; $R^{15}$ is an alkyl which may be substituted and has 1 to 20 carbon atoms, or an aryl which may be substituted and has 6 to 20 carbon atoms; with the proviso that any of $R^8$ and $X^2$ has at least one hydroxy group.

7. The copolymer according to claim 6, wherein $R^7$ in general formula (a2) is hydrogen.

8. The copolymer according to claim 6, wherein $R^8$ in general formula (a2) is hydrogen or an alkyl which is substituted with a hydroxy group and has 1 to 20 carbon atoms.

9. The copolymer according to claim 6, wherein the $X^2$ in general formula (a2) is a propylene or a structure represented by the following formula (b):

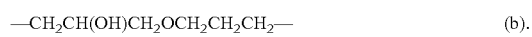
—CH$_2$CH(OH)CH$_2$OCH$_2$CH$_2$CH$_2$— (b).

10. The copolymer according to claim 8, wherein $R^8$ is a 2,3-dihydroxypropyl.

11. The copolymer according to claim 6, wherein at least one of $R^9$ to $R^{14}$ is methyl.

12. The copolymer according to claim 6, wherein $R^{15}$ is methyl or n-butyl.

13. The copolymer according to claim 6, wherein n is an integer of 1 to 6 and has no distribution.

14. The copolymer according to claim 1, further comprising a non-silicone hydrophilic monomer as a copolymerization component.

15. The copolymer according to claim 14, wherein the non-silicone hydrophilic monomer is selected from the group consisting of N,N-dimethyl acrylamide (DMA), N-vinylpyrrolidone (NVP), 2-hydroxyethyl acrylate, glycerol methacrylate, 2-hydroxyethyl methacrylamide, polyethylene glycol monomethacrylate, methacrylic acid, acrylic acid, N-vinyl-N-methylacetamide, N-vinyl-N-ethylacetamide, N-vinyl-N-ethylformamide, N-vinylformamide, N-2-hydroxyethylvinyl carbamate, N-carboxy-β-alanine N-vinyl ester, a reactive polyethylene polyol, a hydrophilic vinyl carbonate, a vinyl carbamate monomer, a hydrophilic oxazolone monomer, a hydrophilic oxazoline monomer and a combination thereof.

16. The copolymer according to claim 1, wherein the mass of the (meth)acrylamide monomer component is 90% by mass or greater based on the mass of all monomer components.

17. The copolymer according to claim 1, wherein the multi-functional (meth)acrylamide monomer is present in an amount of about 0.1 part by mass to about 20 parts by mass.

18. The copolymer according to claim 1, wherein the mono-functional linear silicone (meth)acrylamide monomer is present in an amount of about 30 parts by mass to about 98 parts by mass.

19. A material for medical device comprised of the copolymer according to claim 1.

20. The material for medical device according to claim 19, wherein the material for medical device is any one selected from a contact lens, an endoscope, a catheter, a transfusion tube, a gas transport tube, a stent, a sheath, a cuff, a tube connector, an access port, a drainage bag, a blood circuit, a wound covering material and a medicine carrier.

21. An ophthalmic lens comprised of the copolymer according to claim 1.

22. A contact lens comprised of the copolymer according to claim 1.

23. The copolymer of claim 1 comprising a modulus of less than 100 psi.

24. The copolymer of claim 1 comprising a water content of about 20 to about 75%.

25. The copolymer of claim 1 wherein the reactive mixture further comprises at least one reactive or non-reactive wetting agent.

26. The copolymer of claim 25 wherein reactive mixture comprises about 1 to about 30% by weight wetting agent based upon total amount of reactive components.

27. The copolymer of claim 25 wherein the wetting agent is selected from the group consisting of poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, poly-N-vinyl-4,5-dimethyl-2-pyrrolidone, polyvinyl imidazole, poly-N-vinyl formamide, poly-N-vinyl (methyl)acetamide, poly-N-methyl-N-vinyl (methyl)acetamide, poly-N-vinyl-N-(methyl)propionamide, poly-N-vinyl-N-methyl-2-(methyl)propionamide, poly-N-vinyl-2-(methyl)propionamide, poly-N-vinyl-N,N'-dimethylurea, poly-N,N-dimethyl acrylamide, poly-N,N-diethyl acrylamide, poly-N-isopropyl acrylamide, polyvinyl alcohol, polyacrylate, polyethylene oxide, poly-2-ethyl oxazoline, heparine, polysaccharide, poly-acryloyl morpholine, and mixtures and copolymers thereof.

28. The copolymer of claim 26 wherein the wetting agent is selected from the group consisting of polyvinylpyrrolidone, poly-N,N-dimethyl acrylamide, polyacrylic acid, polyvinyl alcohol, poly-N-methyl-N-vinyl (methyl)acetamide and copolymers and mixtures thereof.

29. The copolymer of claim 26 wherein the wetting agent is selected from the group consisting of polyvinylpyrrolidone and poly-N,N-dimethyl acrylamide.

30. The copolymer of claim 25 wherein reactive mixture comprises about 3 to about 20% by weight wetting agent based upon total amount of reactive components.

* * * * *